United States Patent
Masaka et al.

(10) Patent No.: US 11,338,395 B2
(45) Date of Patent: May 24, 2022

(54) METHOD OF DETERMINING METAL GASKET WELDING LOCATION

(71) Applicant: NOK CORPORATION, Tokyo (JP)

(72) Inventors: Takeshi Masaka, Kikugawa (JP); Kento Nagamatsu, Fujisawa (JP); Kazuaki Setoguchi, Fujisawa (JP)

(73) Assignee: NOK CORPORATION

(*) Notice: Subject to any disclaimer, the term of this patent is extended or adjusted under 35 U.S.C. 154(b) by 137 days.

(21) Appl. No.: 16/963,429

(22) PCT Filed: Oct. 31, 2019

(86) PCT No.: PCT/JP2019/042819
§ 371 (c)(1),
(2) Date: Jul. 20, 2020

(87) PCT Pub. No.: WO2020/095817
PCT Pub. Date: May 14, 2020

(65) Prior Publication Data
US 2021/0039205 A1 Feb. 11, 2021

(30) Foreign Application Priority Data
Nov. 5, 2018 (JP) .............................. JP2018-207921

(51) Int. Cl.
*B23K 31/00* (2006.01)
*B23K 31/12* (2006.01)
*H01M 50/403* (2021.01)

(52) U.S. Cl.
CPC ......... *B23K 31/125* (2013.01); *H01M 50/403* (2021.01)

(58) Field of Classification Search
CPC ........ B23K 31/12–125; B23K 2101/14; B23K 2101/02; H01M 50/403; H01M 8/0206;
(Continued)

(56) References Cited

U.S. PATENT DOCUMENTS

| | | | | |
|---|---|---|---|---|
| 4,026,455 A | * | 5/1977 | Huebner | ............ F28D 19/042 228/118 |
| 2005/0029985 A1 | * | 2/2005 | Hano | ................ H01M 50/10 320/112 |

(Continued)

FOREIGN PATENT DOCUMENTS

| | | |
|---|---|---|
| JP | H11-037294 A | 2/1999 |
| JP | 2006-504872 A | 2/2006 |

(Continued)

OTHER PUBLICATIONS

International Search Report issued in PCT/JP2019/042819 (in English and Japanese); dated Dec. 17, 2019; ISA/JP.

*Primary Examiner* — Kiley S Stoner
(74) *Attorney, Agent, or Firm* — Harness, Dickey & Pierce, P.L.C.

(57) ABSTRACT

A welding position is provided which can prevent surface pressure drop in a seal bead in a pair of metal gaskets is determined. Joint surfaces of a pair of metal gaskets are joined to each other by welding. The pair of metal gaskets include a seal bead that encloses opening and a plurality of structures that bulge from the joint surfaces. A pressure-sensitive medium is sandwiched between the seal bead and a member to be engaged so that the pair of joined metal gaskets and the member to be engaged are stacked on one another, and the pair of joined metal gaskets are tightly engaged with the member to be engaged. The tight engagement is released, and a surface-pressure-drop location in the seal bead is detected based on a mark which remains on the pressure-sensitive medium after the release of the tight engagement. An additional welding position is determined in a rectangular area which is defined by four sides contacting a first structure closest to the surface-pressure-drop (Continued)

location and a second structure closest to the first structure to surround the first structure and the second structure.

14 Claims, 4 Drawing Sheets

(58) Field of Classification Search
CPC ............. H01M 8/0254; H01M 8/1004; H01M 8/1007; Y02E 60/10; Y02E 60/50; F16J 15/08; F16J 15/0818; F16J 2015/0875
USPC .............................. 228/102–105, 183, 8–12
See application file for complete search history.

(56) References Cited

U.S. PATENT DOCUMENTS

| | | |
|---|---|---|
| 2005/0191537 A1 | 9/2005 | Belchuk |
| 2007/0231619 A1 | 10/2007 | Strobel et al. |
| 2008/0160234 A1* | 7/2008 | Yoshida ............ H01M 10/0436 428/34.1 |
| 2009/0246607 A1* | 10/2009 | Shinyashiki .......... B32B 15/043 429/90 |
| 2010/0112405 A1* | 5/2010 | Peters ................. H01M 8/0276 429/513 |
| 2011/0027645 A1* | 2/2011 | Komatsuki ......... H01M 50/636 429/185 |
| 2013/0280559 A1* | 10/2013 | Gui ..................... H01M 10/425 429/7 |
| 2016/0344014 A1* | 11/2016 | Yamada .................. G01F 17/00 |
| 2017/0084947 A1* | 3/2017 | Kakinuma ........... H01M 50/116 |
| 2020/0168932 A1* | 5/2020 | Ramanan ........... H01M 8/04104 |
| 2021/0399374 A1* | 12/2021 | Kagami ............ H01M 10/0585 |

FOREIGN PATENT DOCUMENTS

| | | |
|---|---|---|
| JP | 2009-152123 A | 7/2009 |
| JP | 2015-169290 A | 9/2015 |
| JP | 2016-081909 A | 5/2016 |

* cited by examiner

METHOD OF DETERMINING METAL GASKET WELDING LOCATION

CROSS REFERENCE TO RELATED APPLICATIONS

This application is a U.S. National Phase application of International Application No. PCT/JP2019/042819, filed on Oct. 31, 2019 and published in Japanese as WO 2020/095817A1 on May 14, 2020 and claims priority to Japanese Patent Application No. 2018-207921, filed on Nov. 5, 2018. The entire disclosures of the above applications are expressly incorporated by reference herein.

BACKGROUND

Technical Field

The present disclosure relates to a metal gasket welding position determination method. A metal gasket is used for fuel batteries or the like, for example. The metal gasket welding position determination method determines welding positions at which a pair of metal gaskets are joined to each other by welding.

Related Art

Fuel batteries have a stack structure in which a plurality of fuel cells are stacked on one another. The fuel batteries include a reaction-electrode part (MEA: Membrane Electrode Assembly) which includes a pair of electrode layers on the both sides of an electrolyte membrane, and separators which are arranged on the both sides in the thickness direction of the reaction-electrode part. An oxidizing gas (air) is supplied to the cathode side of the reaction-electrode part, and a fuel gas (hydrogen) is supplied to the anode side. As a result, electric power is produced by the electrochemical reaction which is reverse reaction of electrolysis of water.

In the stacked fuel cells, flow paths for medium fluids such as oxidizing gas (air), fuel gas (hydrogen), cooling water, and the like are formed. The flow paths are formed by the separators, for example. The separators are formed of a pair of metal gaskets of a metal material (e.g., iron and aluminum) which are joined to each other, for example. The flow paths for medium fluids are formed between a pair of metal gaskets, and between the metal gasket and another member. Such a metal gasket is referred to as bipolar plate.

Japanese Patent Laid-Open Publication No. 2006-504872 (hereinafter "Patent Literature 1") discloses metal gaskets (bipolar plates 3, 3') which have openings (openings 4, 5a, and 5b) (see paragraphs [0041] and [0043], and FIG. 4 in Patent Literature 1). Seal beads (bead arrangements 7, 7') enclose the opening and seal against leakage from the periphery of the opening. One bead arrangement 7 communicates with the outside through perforations 8 (see FIGS. 5a and 5b in Patent Literature 1), and another bead arrangement 7' communicates with the outside through tunnels (ducts 28) (see FIGS. 6a and 6b in Patent Literature 1). Accordingly, the metal gaskets guide medium fluids such as oxidizing gas (air), fuel gas (hydrogen), and cooling water to their corresponding desired paths (see paragraphs [0053] to [0056] in Patent Literature 1).

The pair of metal gaskets are joined to each other by welding, for example (see paragraphs [0032] and [0059] in Patent Literature 1). At this time, in order to bring the seal bead in tight contact with a member to be contacted under a specified pressure to surely provide good sealing characteristics, it is important to weld the metal gaskets to each other without horizontal deviation. If such horizontal deviation occurs between the metal gaskets, the seal bead may be buckled so that surface pressure reduction or drop (hereinafter, referred to as "surface pressure drop" through this specification) will occur. As a result, the sealing characteristics may be poor. For this reason, it is necessary to carefully determine welding positions and the number of the welding positions.

However, because the metal gaskets have a very small and complicated shape, when they are stacked together with the reaction-electrode parts and the like on one another and tightly engaged with each other it is not easy to analyze how stresses are applied to parts of the metal gaskets. For this reason, surface pressure drop may occur in a local area of the seal bead. Because surface pressure drop may cause mixture of different types of fluids, such surface pressure drop is necessarily prevented.

Not only such surface pressure drop occurrence itself but also the location of the surface pressure drop occurrence cannot be determined without experimental verification. Also, even if surface pressure drop occurrence is found, it cannot surely determine the position to be additionally welded to prevent the surface pressure drop. Of course, it can be easily conceived that the position to be additionally welded is located in proximity to the location of the surface pressure drop occurrence. However, a specific position to be additionally welded cannot be clearly pointed out. In addition, from viewpoint of space, a position of the metal gaskets in proximity to the location of the surface pressure drop occurrence may not be additionally welded.

It is an object of the present disclosure to determine a welding position which can prevent surface pressure drop in a seal bead.

SUMMARY

The present disclosure provides a metal gasket welding position determination method including:

joining joint surfaces of a pair of metal gaskets that include a seal bead enclosing an opening and a plurality of structures bulging from the joint surfaces to each other by welding;

sandwiching a pressure-sensitive medium between the seal bead and a member to be engaged whereby stacking the pair of joined metal gaskets and the member to be engaged on one another, and tightly engaging the pair of joined metal gaskets with the member to be engaged;

detecting a location of surface pressure drop in the seal bead based on a mark which remains on the pressure-sensitive medium after the releasing the tight engagement; and defining a rectangular area by four sides contacting a first structure closest to the location of surface pressure drop and a second structure closest to the first structure in the plurality of structures to surround the first and second structures, and determining an additional welding position in the rectangular area.

ADVANTAGEOUS EFFECTS

According to the present disclosure, occurrence of seal bead surface pressure drop can be detected, and an additional welding position capable of preventing the surface pressure drop can be found.

DETAILED DESCRIPTION

The following description will describe a metal gasket welding position determination method according to an embodiment with reference to drawings.

The metal gasket welding position determination method according to this embodiment determines a welding position at which a pair of bipolar plates 11 are joined to each other. The bipolar plates 11 are used as metal gaskets for a fuel battery. More specifically, the method according to this embodiment can find an additional welding position which prevents surface pressure drop in a seal bead 31 which is formed in the bipolar plate 11.

Structure of Bipolar Plate (Metal Gasket)

Figure 1:
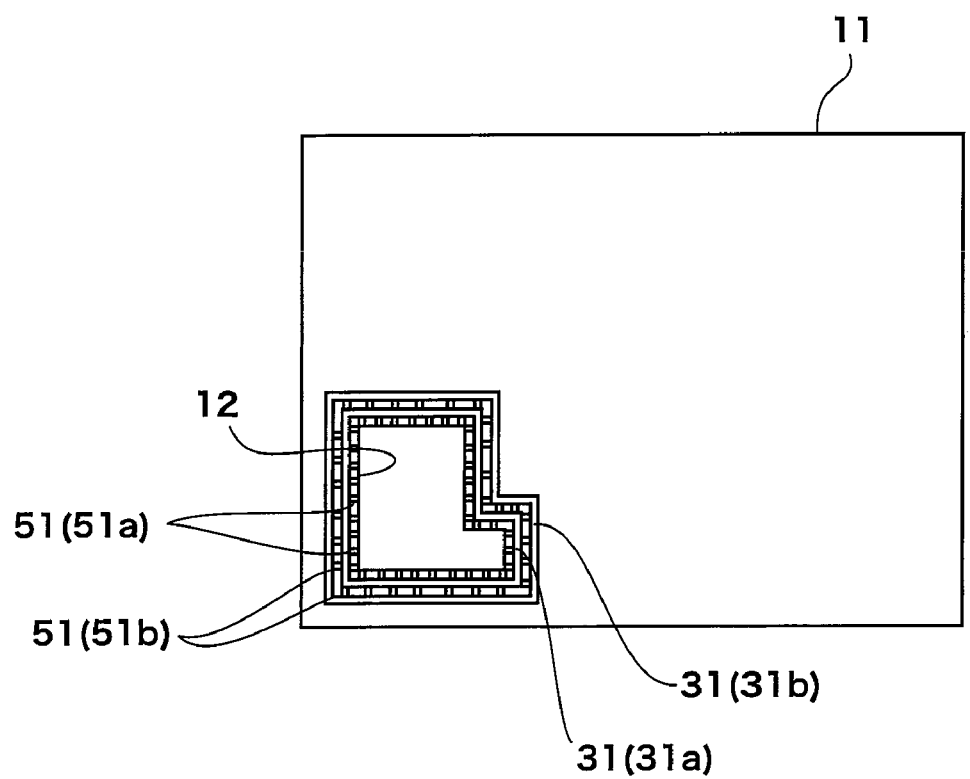
FIG. 1 is a plan view showing bipolar plates (metal gaskets) according to an embodiment.

As shown in FIG. 1, the bipolar plates 11 have a rectangular shape. The bipolar plates 11 have an opening 12. The opening 12 has a shape which is obtained by combining two, larger and smaller rectangular shapes. When pairs of the bipolar plates 11 are stacked together with reaction-electrode parts (not shown) and the like on one another, and tightly engaged with each other, their openings 12 forms a manifold (not shown) through which various types of fluids flow.

Seal beads 31 are arranged in two lines parallel to each other so that they enclose the opening 12. For ease of explanation, one of the seal beads which is arranged closer to the opening 12 is occasionally referred to as first seal bead 31a, and another seal bead which is arranged on the outer periphery side with respect to the seal bead 31a is occasionally referred to as second seal bead 31b. A plurality of tunnels 51 are connected to the seal beads 31 (31a, 31b). The pair of bipolar plates 11 have reverse shapes which are inside out with respect to each other. Cavities 32 are formed inside the seal beads 31 by joining the pair of joint surfaces 13 so that communication paths 52 are formed inside the tunnels 51 (see FIG. 3).

Figure 2:
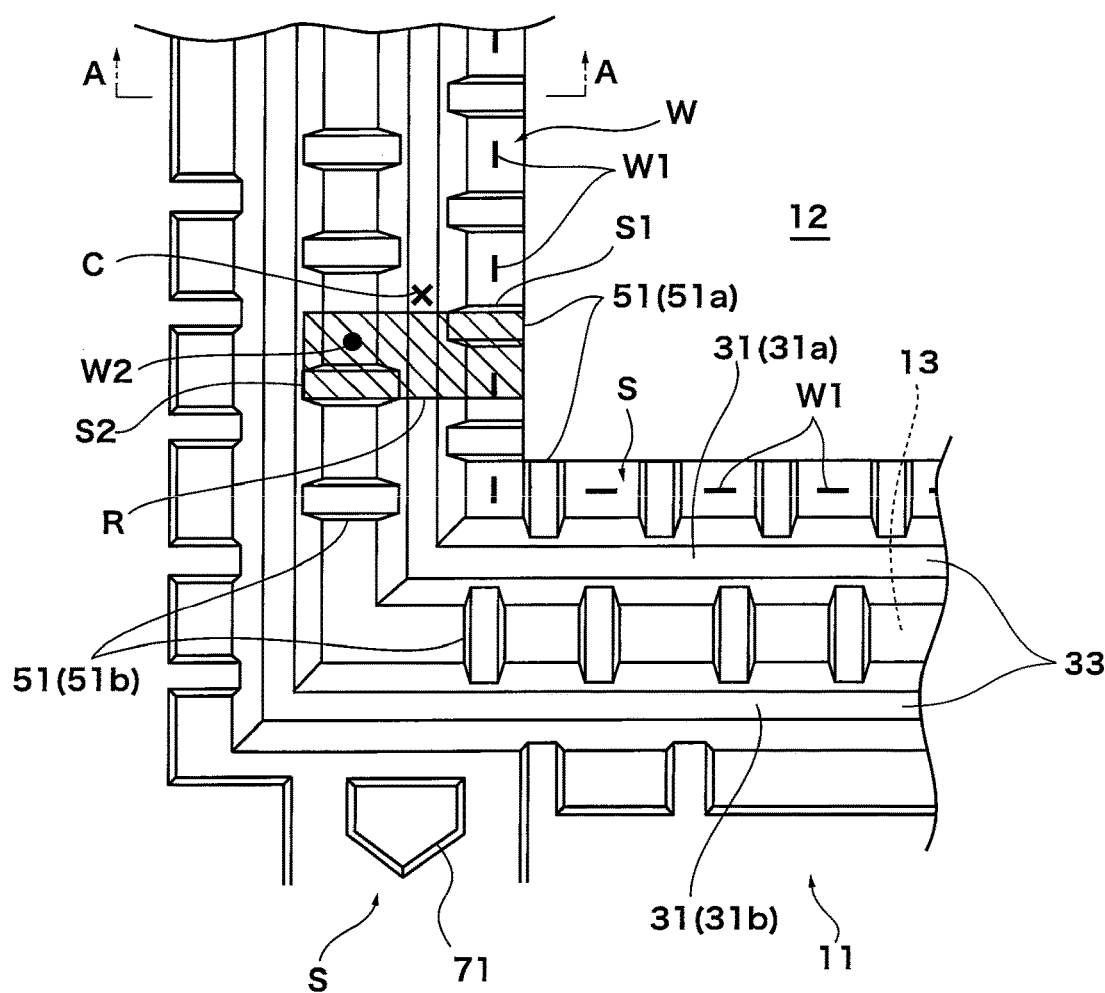
FIG. 2 is an enlarged plan view showing peripheral structures of seal beads and tunnels.
Figure 3:
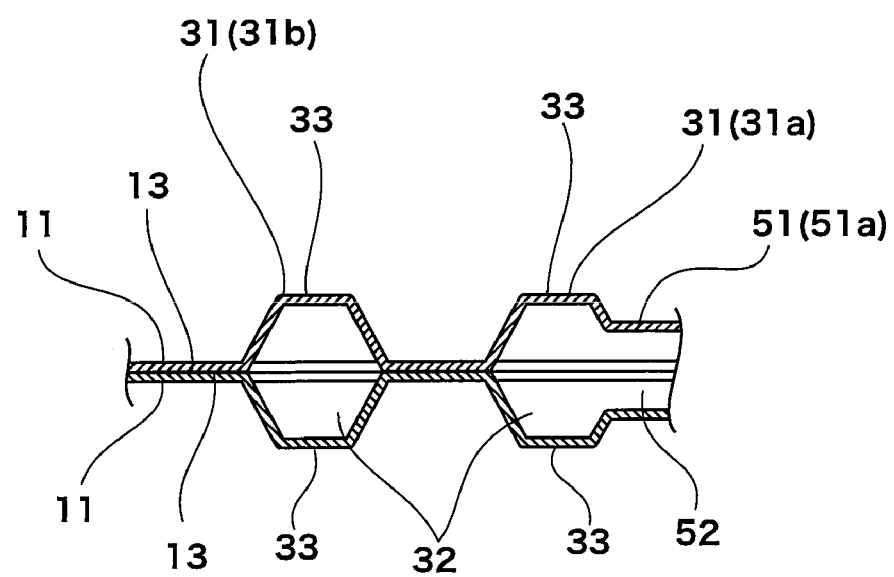
FIG. 3 is a cross-sectional view taken along the line A-A in FIG. 2.

As shown in FIGS. 2 and 3, the seal beads 31 (31a, 31b) in the two lines bulge along the opening 12 from the back surface side of the joint surface 13. The seal beads 31 have a trapezoidal shape as viewed in a cross-sectional view so that a flat sealing surface 33 is formed on their top.

The plurality of tunnels 51 correspond to structures S which bulge from the back surface side of the joint surface 13. The tunnel 51 is connected to a central part of the inclined side of the trapezoidal seal bead 31 so that the communicating path 52 which communicates with the cavity 32 is formed inside the tunnel 51. The first tunnel 51a extends to the opening 12 so that the opening 12 communicates with the cavity 32 inside the first seal bead 31a, The second tunnel 51b connects the first seal bead 31a and the second seal bead 31b to each other so that their cavities 32 communicate with each other. The first tunnel 51a and the second tunnel 51b are not aligned on one straight line but they are spaced away from each other in a direction perpendicular to extension direction of communicating paths 52 inside them.

The bipolar plates 11 further include a rectification bead 71. The rectification bead 71 corresponds to the structure S which bulges from the back surface side of the joint surface 13. The rectification bead 71 controls a flow of fluid which flows on the back surface side of the joint surface 13 whereby equalizing its flow rate.

Bipolar Plate (Metal Gasket) Welding Position Determination Method

The bipolar plate welding position determination method according to this embodiment includes a joint process, a detection process, and a determination process. In the joint process, the joint surfaces 13 of the pair of bipolar plates 11 are joined to each other by welding. In the detection process, a location of surface pressure drop in the seal bead 31 is detected. In the determination process, an additional welding position is determined.

(1) Welding Process

A pair of bipolar plates 11 are positioned relative to each other so that the joint surfaces 13 contact each other. The pair of bipolar plates 11 are joined to each other by welding. The welded parts are shown as initial welding positions W1 in FIG. 2. That is, the initial welding positions W1 are arranged on the joint surfaces 13 between the plurality of first tunnels 51a which extend to the opening 12.

In a case in which the pair of bipolar plates 11 are joined to each other by welding the joint surfaces at the initial welding positions W1 without any horizontal deviation, surface pressure drop does not be occur in the seal beads 31. In this case, additional welding is not required. On the other hand, in a case in which a horizontal deviation occurs when the bipolar plates 11 are joined to each other, surface pressure drop caused by buckling of the seal bead 31 may occur depending on the location where horizontal deviation occurs. In this embodiment, in the later-discussed detection process, it is determined whether surface pressure drop occurs or not, and where the surface pressure drop occurs. If surface pressure drop occurs, the bipolar plates are joined to each other by additional welding at an additional welding position which is determined in the determination process.

(2) Detection Process

The location of the occurrence of surface pressure drop (hereinafter, occasionally referred to as "surface-pressure-drop location C") in the seal bead 31 is detected.

Figure 4A:
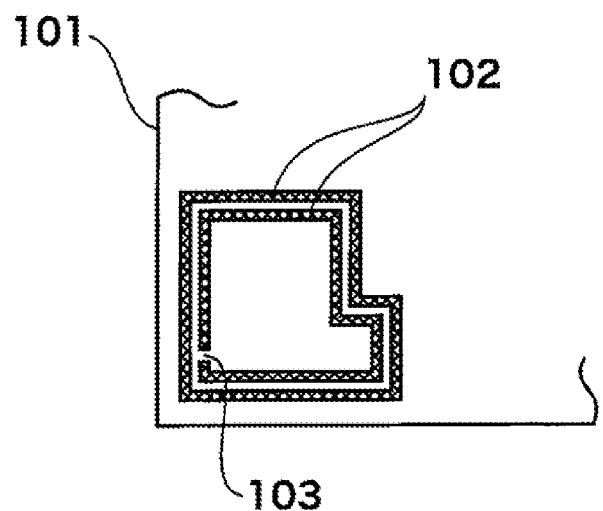
FIG. 4A is a plan view illustrating marks which remain on a pressure-sensitive medium.
Figure 4B:
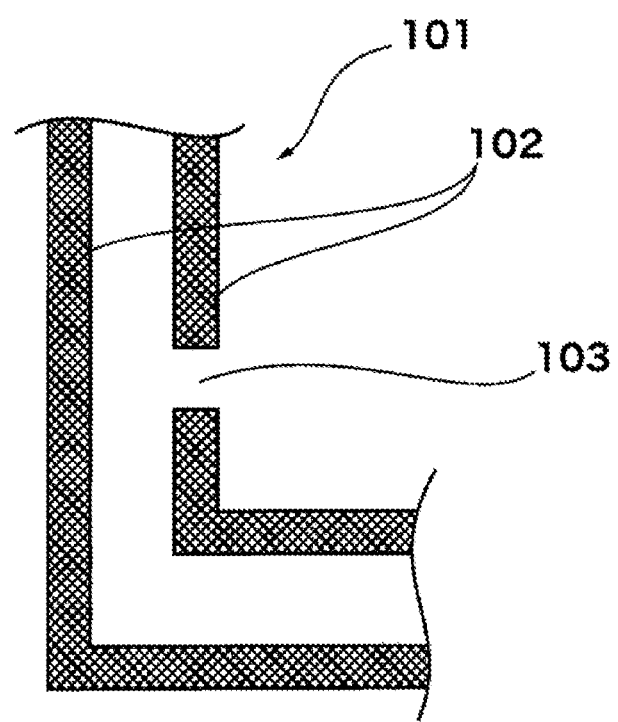
FIG. 4B is an enlarged plan view illustrating parts of the marks.

In order to detect the surface-pressure-drop location C, pairs of bipolar plates 11 are stacked together with the reaction-electrode parts (not shown) on each other, and are tightly engaged with each other. The bipolar plates in each pair are joined to each other by welding prior to the tight engagement. In this process, a pressure-sensitive media 101 (see FIGS. 4A and 4B) such as pressure sensitive paper is sandwiched between the seal bead 31 and a member to be engaged. A pressure applied to the bipolar plates 11 in the tight engagement is substantially equal to a pressure which is applied in actual products which use the bipolar plates 11, in other words, a pressure which is applied when the fuel battery is produced. The pressure will deform the seal bead 31 and bring the seal beads 31 in tight contact with the member to be engaged so that sealing effects can be provided.

After the tight engagement of the stacked members including the bipolar plates 11, the tight engagement is released so that the pressure-sensitive medium 101 is removed. In a case in which the seal bead 31 is in tight contact with the member to be engaged under the specified pressure, marks 102 will continuously remain along tight contact zones between the seal bead 31 and the member to be engaged on the pressure-sensitive medium 101. If the marks 102 have a faint part or a disconnection (collectively referred to as "disconnection 103"), it can be determined that surface pressure drop occurs in the disconnection. The disconnection 103 in the marks 102 can be detected by an image inspection apparatus, for example. As a result, the surface-pressure-drop location C in the seal bead 31 can be detected (see FIGS. 2 and 4B).

(3) Determination Process

If it is determined that surface pressure drop occurs, an additional welding position which can eliminate the surface pressure drop is determined.

The additional welding position is determined in a rectangular area R which is defined by four sides contacting a structure (first structure) S closest to the surface-pressure-drop location C and a structure (second structure) S closest to the first structure S to surround the first structure S and the second structure S. The additional welding position can be any point as long as it is located in the rectangular area R, and can be determined in consideration of ease of welding and the like. The first structure S1, the second structure S2, and the additional welding position W2 at which the bipolar plates are joined to each other by additional welding are shown in FIG. 2. In addition, the rectangular area R is shown by the hatched rectangle.

No special requirements are applied to the second structure S2 other than the requirement that it is a structure S closest to the first structure S1. On the other hand, in this embodiment, in the case in which the first structure S1 is the first tunnel 51a which is located close to the opening 12, because the initial welding position W1 is arranged between the first tunnels 51a, if another first tunnel 51a is selected as the second structure S2, there is a high possibility that the additional welding position W2 overlaps one of the initial welding positions W1 at which the bipolar plates have been joined to each other by welding. For this reason, in the case in which the first structure S1 is the first tunnel 51a, it is preferable that the second structure S2 is selected from the structures S that are arranged on the opposite side of the first seal bead 31a from the first structure S1.

For ease of explanation, the initial welding positions W1 and the additional welding position W2 are collectively referred to as welding positions W.

According to this embodiment, after the pair of bipolar plates 11 are joined at the initial welding positions W1 to each other by welding, they are inspected. If surface pressure drop in the seal beads 31 is detected, an additional welding position W2 which prevents the surface pressure drop can be found based on the detected surface-pressure-drop part C.

In the practical welding process, welding positions W are defined by initial welding positions W1 and additional welding positions W2 so that the pair of bipolar plates 11 are joined at the welding positions W to each other by welding. As a result, surface pressure drop in the seal beads 31 can be prevented so that good sealing characteristics are surely provided. The reasons will be described below.

The seal beads 31 are relatively easily buckled in a direction perpendicular to a flow direction of a fluid which flows through the seal beads 31 (right-and-left direction). For this reason, if a number of initial welding positions W1 are arranged on the both sides of the seal bead in the right-and-left direction, the buckling of the seal bead 31 can be suppressed. However, as the number of the initial welding positions W1 increases, the joint operation of the bipolar plates 11 becomes more laborious. Also, there are places which are unsuitable for the initial welding position W1 from the viewpoint of space. Therefore, too many initial welding positions W1 cannot be provided.

It is found that when a number of pairs of bipolar plates 11 in which bipolar plates 11 are joined to each other in each pair are stacked together with reaction-electrode parts (not shown) on each other, surface pressure drop occurs in unexpected places in the seal beads 31. It is estimated that horizontal deviation between the bipolar-plates 11 causes the surface pressure drop occurrence. Areas in which the structures S such as tunnels 51 and rectification bead 71 have relatively higher rigidity than other areas. For this reason, it can be conceived that although a vertical force is applied, such local rigidity difference will produce forces that twist areas around the structures S about the structures S so that horizontal deviation occurs.

In this embodiment, the surface-pressure-drop part C is detected (detection process), and an additional welding position W2 is determined in the rectangular area R (determination process). This additional welding position can prevent the horizontal deviation which occurs between the pair of bipolar plates 11. The reason to prevent the horizontal deviation by the additional welding is that the rectangular area R is defined by four sides contacting the first structure S1 closest to the surface-pressure-drop location C in the seal bead 31 and the second structure S2 closest to the first structure S1 to surround the first structure S1 and the second structure S2. That is, the horizontal deviation between the bipolar plates 11 about two structures S1 and S2 that are close to the surface-pressure-drop part C can be prevented by determining a position between the two structures S1 and S2 as the additional welding position W2.

FIG. 2 shows exemplary determination in which one of the first tunnels 51a that are arranged on a line close to the opening 12 is selected as the first structure S1, and one of the second tunnels 51b that are arranged on the opposite side of the first seal bead 31a away from the first structure S1 is selected as the second structure S2. On the other hand, in a case in which one of the second tunnels 51b is selected as the first structure S1, another second separated tunnel 51b is selected as the second structure S2. Also, the rectification bead 71 may be selected as the first structure S1 or the second structure S2 depending on the surface-pressure-drop part C.

The embodiment has been described with reference to the drawings. However, the present disclosure is not limited to the foregoing embodiment, but various changes and modifications can be made in practical applications.

For example, in the pair of bipolar plates 11 according to the embodiment, a group of the first tunnels 51a which extend to the opening 12 and a group of second tunnels 51b which are arranged further away from the opening 12 relative to the first tunnel 51a are arranged in two lines in a staggered configuration. In the determination process, one of the first tunnels 51a is selected as the first structure S1, and one of the second tunnels 51b is selected as the second structure S2 so that an additional welding position is determined in the rectangular area R which is defined by four sides contacting the two structures S1 and S2. It is noted that the two structures S1 and S2 based on which the rectangular area R is determined in the determination process are not limited to the structures which are arranged in two lines in a staggered configuration in the bipolar plates 11. In the determination process, what is only required is that an additional welding position is determined in a rectangular area R which is defined by four sides contacting two selected structures S1 and S2.

The determination process in another modified embodiment is not limited to the determination process in which an additional welding position is determined in the bipolar plates 11 which includes the seal beads 31a and 31b arranged in two lines as shown in FIG. 2.

Any other changes and modifications can be made in practical applications.

The invention claimed is:

1. A metal gasket welding position determination method comprising:
   joining joint surfaces of a pair of metal gaskets that include a seal bead enclosing an opening and a plurality of structures bulging from the joint surfaces to each other by welding;
   sandwiching a pressure-sensitive medium between the seal bead and a member to be engaged whereby stacking the pair of joined metal gaskets and the member to be engaged on one another, and tightly engaging the pair of joined metal gaskets with the member to be engaged;
   detecting a location of surface pressure drop in the seal bead based on a mark which remains on the pressure-sensitive medium after the releasing the tight engagement; and
   defining a rectangular area by four sides contacting a first structure closest to the location of surface pressure drop and a second structure closest to the first structure in the plurality of structures to surround the first and second structures, and determining an additional welding position in the rectangular area.

2. The metal gasket welding position determination method according to claim 1, wherein the seal bead includes
   a first seal bead arranged on the inner periphery side, and
   a second seal bead arranged on the outer periphery side with respect to the first seal bead.

3. The metal gasket welding position determination method according to claim 1, wherein the plurality of structures include a plurality of tunnels that bulge from the joint surfaces.

4. The metal gasket welding position determination method according to claim 3, wherein the plurality of tunnels include
   a first tunnel connecting the opening and the first seal bead to each other, and
   a second tunnel connecting the first seal bead and the second seal bead to each other.

5. The metal gasket welding position determination method according to claim 1, wherein the plurality of structures include a rectification bead that controls a flow of fluid which flows on the back surface side of the joint surface.

6. The metal gasket welding position determination method according to claim 1, wherein the first structure and the second structure are arranged on opposite sides of the seal bead.

7. The metal gasket welding position determination method according to claim 2, wherein the plurality of structures include a plurality of tunnels that bulge from the joint surfaces.

8. The metal gasket welding position determination method according to claim 2, wherein the plurality of structures include a rectification bead that controls a flow of fluid which flows on the back surface side of the joint surface.

9. The metal gasket welding position determination method according to claim 3, wherein the plurality of structures include a rectification bead that controls a flow of fluid which flows on the back surface side of the joint surface.

10. The metal gasket welding position determination method according to claim 4, wherein the plurality of structures include a rectification bead that controls a flow of fluid which flows on the back surface side of the joint surface.

11. The metal gasket welding position determination method according to claim 2, wherein the first structure and the second structure are arranged on opposite sides of the seal bead.

12. The metal gasket welding position determination method according to claim 3, wherein the first structure and the second structure are arranged on opposite sides of the seal bead.

13. The metal gasket welding position determination method according to claim 4, wherein the first structure and the second structure are arranged on opposite sides of the seal bead.

14. The metal gasket welding position determination method according to claim 5, wherein the first structure and the second structure are arranged on opposite sides of the seal bead.

* * * * *